US007079025B2

(12) United States Patent
Michalson et al.

(10) Patent No.: US 7,079,025 B2
(45) Date of Patent: Jul. 18, 2006

(54) RECONFIGURABLE GEOLOCATION SYSTEM

(75) Inventors: William R. Michalson, Charlton, MA (US); Ilir F. Progri, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 122 days.

(21) Appl. No.: 10/459,724

(22) Filed: Jun. 11, 2003

(65) Prior Publication Data

US 2004/0070498 A1    Apr. 15, 2004

Related U.S. Application Data

(60) Provisional application No. 60/387,701, filed on Jun. 11, 2002, provisional application No. 60/387,697, filed on Jun. 11, 2002.

(51) Int. Cl.
*G08B 1/08*    (2006.01)

(52) U.S. Cl. ............... 340/539.13; 340/539.1; 340/539.11; 340/539.21; 340/539.23; 342/450; 367/117

(58) Field of Classification Search ........... 340/539.13, 340/539.14, 539.1, 539.11, 539.12, 539.15, 340/539.21, 539.23, 573.1, 686.1; 367/117, 367/118, 123; 342/436, 450, 458, 463
See application file for complete search history.

(56) References Cited

U.S. PATENT DOCUMENTS

| | | | |
|---|---|---|---|
| 5,309,351 A * | 5/1994 | McCain et al. ............ 700/3 |
| 5,490,073 A * | 2/1996 | Kyrtsos .................... 701/207 |
| 5,506,864 A | 4/1996 | Schilling .................. 375/205 |
| 5,657,343 A | 8/1997 | Schilling .................. 375/202 |
| 5,663,956 A | 9/1997 | Schilling .................. 370/335 |
| 5,677,928 A | 10/1997 | Rizzo et al. ............... 375/202 |
| 5,719,584 A | 2/1998 | Otto ......................... 342/465 |
| 5,815,114 A * | 9/1998 | Speasl et al. ........... 342/357.06 |
| 5,881,094 A | 3/1999 | Schilling .................. 375/202 |
| 5,898,733 A * | 4/1999 | Satyanarayana ........... 375/133 |
| 5,914,687 A | 6/1999 | Rose ........................ 342/442 |
| 5,926,133 A | 7/1999 | Green, Jr. ................. 342/363 |
| 5,943,331 A | 8/1999 | Lavean .................... 370/335 |
| 5,969,673 A | 10/1999 | Bickley et al. .......... 342/357.09 |

(Continued)

FOREIGN PATENT DOCUMENTS

WO    WO 99/63358    9/1999

(Continued)

OTHER PUBLICATIONS

Progri, I., et al., "A System for Tracking and Locating Emergency Personnel Inside Buildings," *ION GPS 2000*, Sep. 19-22, 2000, Salt Lake City, UT; pp. 560-568.

(Continued)

*Primary Examiner*—Davetta W. Goins
(74) *Attorney, Agent, or Firm*—Bromberg & Sunstein LLP

(57) ABSTRACT

A portable reconfigurable geolocation system is provided. The system includes a portable user node and one or more portable pseudolite nodes in communication one another and with the user node. Each of the user nodes and pseudolite nodes includes a transmitter that generates a signal on one or more carrier frequencies. Each signal is modulated with digital signals necessary to establish distances between the nodes and to convey data between the nodes. Each node also includes a receiver for receiving and demodulating the signals transmitted between the nodes, and a processor for receiving the demodulated signals, extracting data values and derived values from the demodulated signals and determining a three-dimensional position of each node in the system.

14 Claims, 4 Drawing Sheets

U.S. PATENT DOCUMENTS

| | | | |
|---|---|---|---|
| 5,973,643 A | 10/1999 | Hawkes et al. | 342/457 |
| 5,974,039 A | 10/1999 | Schilling | 370/335 |
| 5,995,046 A | 11/1999 | Belcher et al. | 342/450 |
| 5,999,131 A | 12/1999 | Sullivan | 342/465 |
| 6,031,487 A | 2/2000 | Mickelson | 342/357.12 |
| 6,054,950 A | 4/2000 | Fontana | 342/463 |
| 6,055,434 A * | 4/2000 | Seraj | 455/456.1 |
| 6,067,017 A | 5/2000 | Stewart et al. | 340/573.1 |
| 6,101,178 A | 8/2000 | Beal | 370/336 |
| 6,104,712 A | 8/2000 | Robert et al. | 370/389 |
| 6,104,911 A | 8/2000 | Diekelman | |
| 6,121,926 A | 9/2000 | Belcher et al. | 342/450 |
| 6,128,328 A | 10/2000 | Schilling | 375/134 |
| 6,134,228 A | 10/2000 | Cedervall et al. | 370/335 |
| 6,160,837 A | 12/2000 | Bruno et al. | 375/130 |
| 6,198,394 B1 | 3/2001 | Jacobsen et al. | 340/573.1 |
| 6,222,828 B1 | 4/2001 | Ohlson et al. | 370/320 |
| 6,233,459 B1 | 5/2001 | Sullivan et al. | 455/456 |
| 6,236,365 B1 | 5/2001 | LeBlanc et al. | 342/457 |
| 6,371,416 B1 * | 4/2002 | Hawthorne | 246/122 R |
| 6,504,794 B1 * | 1/2003 | Haase et al. | 367/119 |
| 6,529,164 B1 * | 3/2003 | Carter | 342/463 |
| 6,608,592 B1 * | 8/2003 | McReynolds | 342/418 |

FOREIGN PATENT DOCUMENTS

WO     WO 02/03091 A2     10/2002

OTHER PUBLICATIONS

Hill, J., et al. "Techniques for Reducing the Near-Far Problem in Indoor Geolocation Systems," *ION NTM 2001*, Jan. 22-24, 2001, Long Beach, CA; pp. 860-865.

Progri, I., et al., "The Impact of Proposed Pseudolite's Signal Structure on the Receiver's Phase and Code Error," *Presented at the Annual Meeting of the Institute of Navigation*, Jun. 11-13, 2001, Albuquerque, New Mexico; pp. 1-9.

Progri, I., et al., "An Alternative Approach to Multipath and Near-Far Problem for Indoor Geolocation Systems," *Presented at the ION-GPS*, 2001, Sep. 11-14, 2001, pp. 1-11.

Patwari et al. Relative Location in Wireless Networks, IEEE.

Capkun, et al., "GPS-free positioning in mobile Ad-Hoc networks", Capkun, et al., Proceedings of the 34th Hawaii International Conference on System Sciences, 2001.

* cited by examiner

RECONFIGURABLE GEOLOCATION SYSTEM

The present application claims priority from U.S. Provisional Applications Serial Nos. 60/387,701 and 60/387,697 both filed on Jun. 11, 2002, both of which are hereby incorporated herein, in their entirety, by reference.

TECHNICAL FIELD

The present invention relates to global positioning systems, and more particularly to apparatus and methods for providing a reconfigurable geolocation system.

BACKGROUND ART

One of the most hazardous jobs firefighters and other emergency personnel must do is to enter a burning building. In this situation, the building floor plan may be unknown (and may change), visibility is impaired, and the locations of equipment and personnel may change. Combining this situation with a limited air supply and potentially obstructed escape paths results in an extremely dangerous environment.

In such an environment, there are strict limits on the amount of time a firefighter may be inside a burning building due to limitations imposed by the limited air supply and on increasing fire and smoke intensity. Additional challenges result as a consequence of the complete or partial failing of the building, which may result in the destruction of escape paths.

Pseudo-satellites, or pseudolites, are commonly known in the art as devices which transmit a GPS, or GPS-type signal, but which are located in relatively close proximity to the ground. When using pseudolites to provide navigation in an indoor, underground or obstructed environment, there is a concern that nearby pseudolites will negatively impact the ability of a receiver to track all of the available pseudolites. This problem, known as the "near-far" problem, is a consequence of limited dynamic range. Some techniques for solving this problem, such as modifying the pseudolite duty cycle or synchronizing the pseudolite transmissions have been previously proposed.

A system for locating emergency personnel in a building has been discussed in "A System of Tracking and Locating Emergency Personnel Inside Buildings" presented by Progri et al. at the Institute of Navigation (ION GPS 2000, Sep. 19–22, 2000, pp. 560–568). Similarly, techniques for dealing with the "near-far" problem have been discussed in "Techniques for Reducing the Near-Far Problem in Indoor Geolocation Systems" presented by Hill et al., at the Institute of Navigation (ION NTM 2001, Jan. 22–24, 2001, pp. 860–865). The above referenced publications and presentations are hereby incorporated herein, in their entirety, by reference.

SUMMARY OF THE INVENTION

In a first embodiment, a portable reconfigurable geolocation system is provided. The system includes a portable user node and at least three portable pseudolite nodes in communication with one another and with the user node. Each of the user nodes and pseudolite nodes includes a transmitter that generates a signal on one or more carrier frequencies. Each signal is modulated with signals necessary to establish distances between the nodes and to convey data between the nodes. Each of the nodes also includes a receiver for receiving and demodulating the signals transmitted between the nodes, as well as a processor for receiving the demodulated signals, extracting data values and derived values (such as range and phase) from the demodulated signals and determining a three-dimensional position of each node in the system.

In accordance with a related embodiment, each user node optionally includes a user interface. In accordance with another related embodiment, communication between the nodes may be wireless. In accordance with further related embodiments, signals generated by the user node and the pseudolite nodes may be modulated by at least two digital signals. The at least two digital signals may establish at least two communication channels that are substantially orthogonal to one another. Similarly, at least one digital signal may provide signal selection for a particular signal frequency, interference resistance, or bit synchronization resolution. The processor may be configured to optimize ranging and communications topology of the system, verify the integrity of information transmitted in the system, and/or provide dynamic reconfiguration of the system in the event of node failure.

In accordance with another embodiment of the invention, a method of locating a communication node in an area is provided. The method includes distributing a plurality of portable nodes within the area; each of the nodes including a transmitter that generates a signal on one or more carrier frequencies, a receiver, and a processor. Communication is established between the nodes, and signals generated by the nodes are modulated with signals necessary to establish distances between the nodes and to convey data between the nodes. A three-dimensional position of each of the nodes is determined using the modulated signals.

In accordance with a related embodiment, modulating signals generated by the nodes may include establishing at least two communication channels that are substantially orthogonal to one another. In accordance with a further related embodiment, establishing communication between the nodes may include establishing wireless communication between the nodes. In accordance with a further related embodiment, modulating signals generated by the nodes may include modulating the signals by at least two digital signals, and at least one digital signal may provide signal selection for a particular signal frequency. Similarly, at least one digital signal may provide interference resistance and/or bit synchronization.

In accordance with another embodiment of the invention, a portable pseudolite node includes a transmitter that generates a signal on one or more carrier frequencies. Each of the signals is modulated with digital signals necessary to establish distances between the nodes and to convey data between the nodes. The pseudolite node also includes receiver for receiving and demodulating the signals transmitted between the nodes. The pseudolite node also includes a processor for receiving the demodulated signals, extracting data values and derived values (such as range and phase) from the demodulated signals and determining a three-dimensional position of each node in the system.

In accordance with a further embodiment of the invention, a method for locating a human in an area includes providing the human with a portable user node. The user node includes a transmitter that generates a signal on one or more carrier frequencies, a receiver, and a processor. A plurality of portable pseudolite nodes are distributed within the area. Each of the pseudolite nodes includes a transmitter that generates a signal on one or more carrier frequencies, a receiver, and a processor. Signals generated by the user node and the pseudolite nodes are modulated with digital signals to establish communication among the user node and the pseudolite nodes and to convey data among the user node and pseudolite nodes. A relative position of the user node and the pseudolite nodes is determined using the modulated signals, and a relative position of the human is determined using the relative position of the user node and the pseudolite nodes. In accordance with a related embodiment, providing the human with a portable user node includes providing the human with a portable user node that includes a user interface. In accordance with a further related embodiment, providing wherein providing the human with a portable user node includes providing the human with a portable user node that includes an input/output device.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The present invention provides users with the ability to accurately navigate in environments where access signals from the Global Positioning System is unavailable and where radio navigation aids are either unavailable or of insufficient accuracy and/or reliability.

Figure 1:
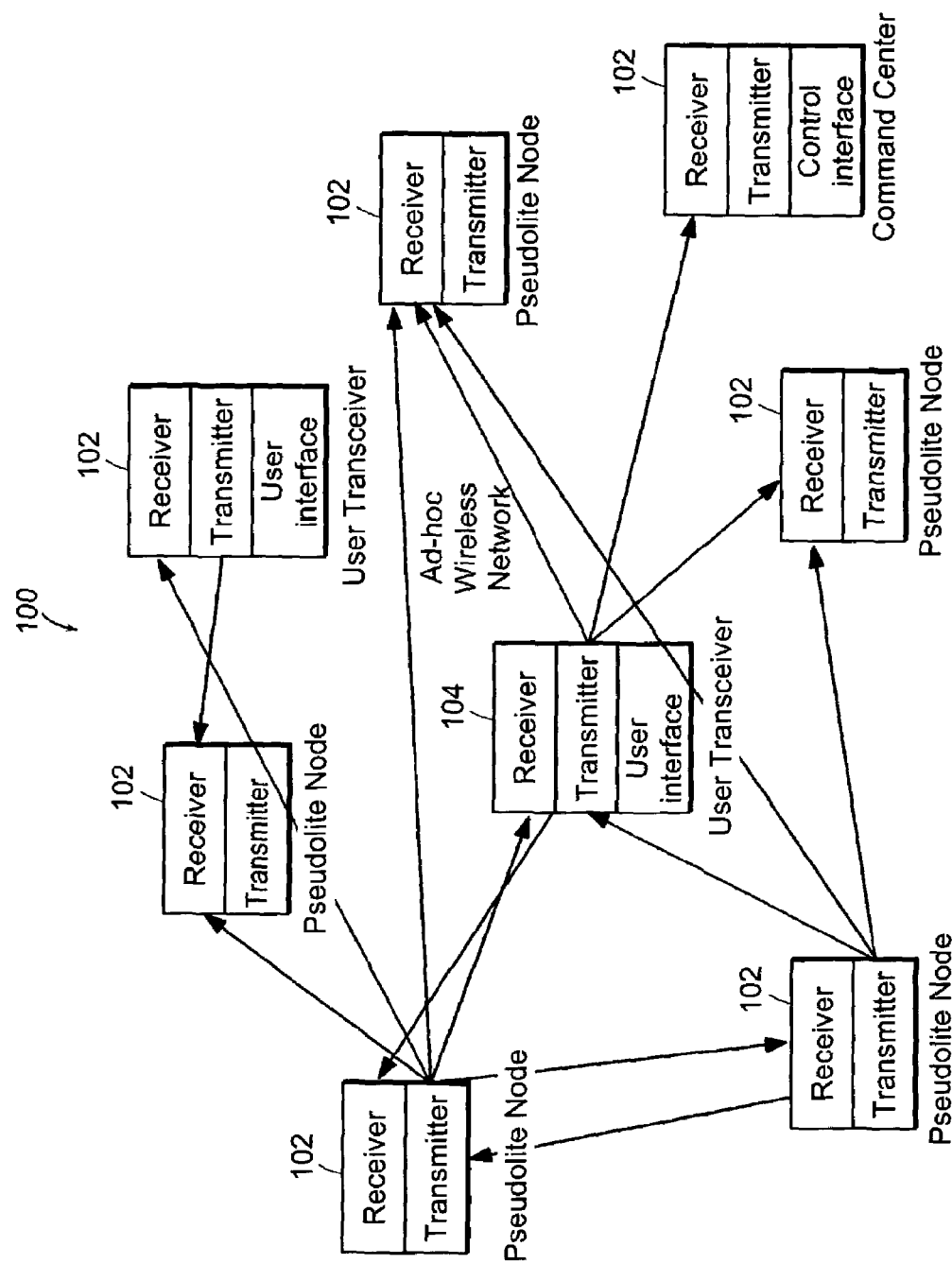
FIG. 1 is a block diagram illustrating a reconfigurable geolocation system in accordance with an embodiment of the invention.

In FIG. 1 is shown a block diagram illustrating a portable reconfigurable geolocation system in accordance with an embodiment of the invention. The system 100 employs a plurality of portable pseudolite nodes 102 as well as one or more portable user nodes 104. The user nodes 104 may be identical to the pseudolite nodes 102 and augmented with an ability to interact in a more sophisticated manner with a user, such as through a user interface and/or data input and output devices.

Figure 2:
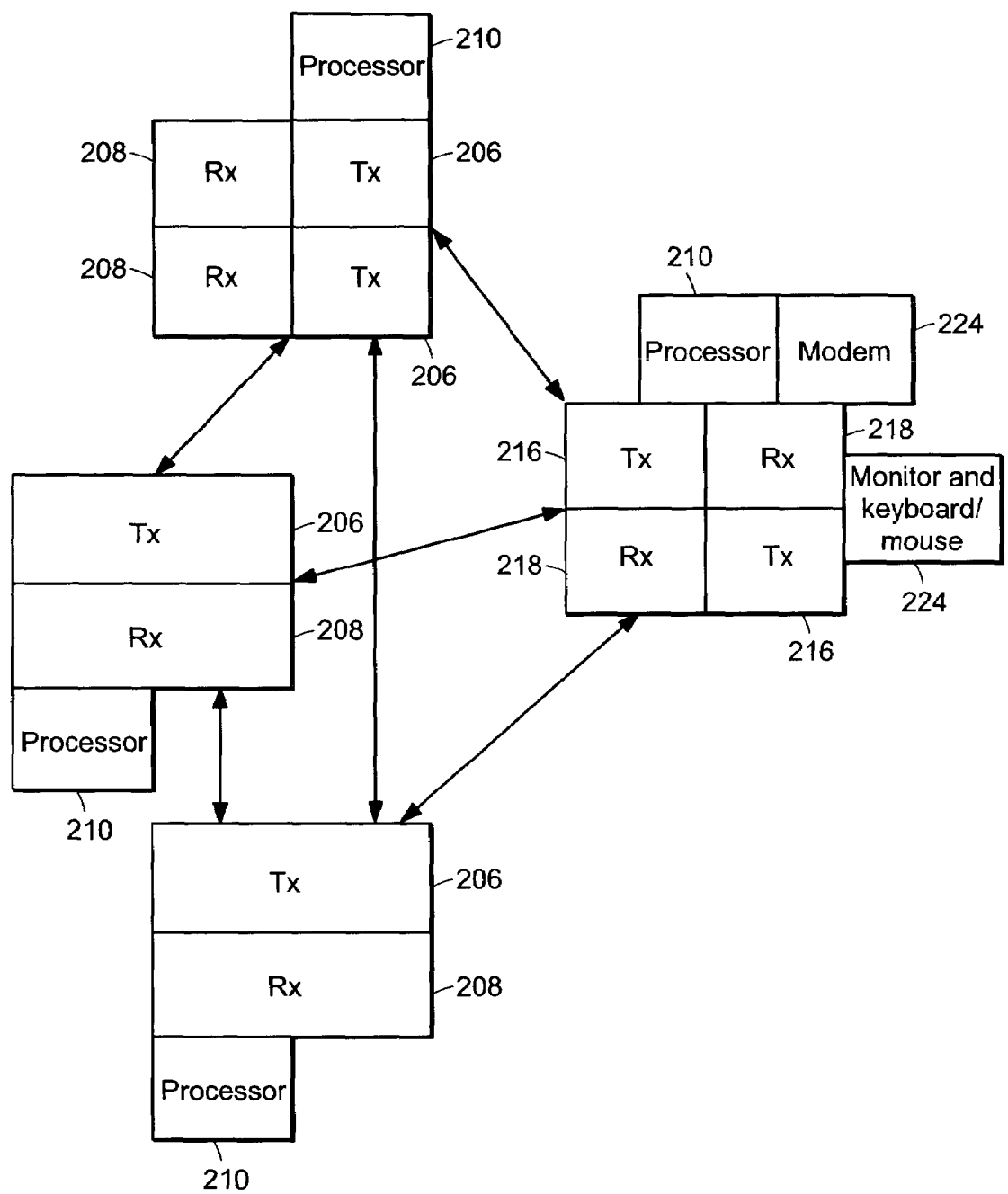
FIG. 2 is a block diagram illustrating a pseudolite node of the reconfigurable geolocation system of FIG. 1.

As shown in FIG. 2 each portable pseudolite node 102 contains one or more transmitters 206 and one or more receivers 208 as well as appropriate antennae and batteries (not shown). Each pseudolite node 102 also includes a computing element or processor 210 which performs any necessary data processing, signal processing, and general control operations to support the operation of the node 102. Each portable user node 104 includes one or more transmitters 216, one or more receivers 218, appropriate antennae and batteries, a processor 220, and a user interface 222. Each user interface 222 may be configured for a particular user. For example, the interface 222 may be part of a hand-held portable device for one user, such as a firefighter or other human being in a building. Similarly, the interface 222 may be a conventional CRT for a user at a command and control center, and the user node may be provided with other input and output devices 224 such as keyboard and mouse, modem, monitor, facsimile and/or printer.

Every pseudolite signal is modulated by three known pseudo random codes at a rate commonly known as the chipping rate and the bandwidth of the resulting signal is proportional to the chipping rate. The first pseudo random code is shorter and is used only to select the appropriate signal from a given channel. The second pseudo random code is identical for every signal and it is used to resolve the bit synchronization and, at the same time, to improve the signal auto-correlation properties. The third pseudo random code is much longer and provides better jammer/interference resistance due to its auto-correlation and cross-correlation properties. Examples of apparatuses and methods that may be used to modulate the pseudolite signals are described in co-pending patent application entitled "Adaptive Spatial Temporal Selective Attenuator with Restored Phase" filed on the same day of the present application (Jun. 11, 2003) and bearing attorney docket number 2627/104, which is hereby incorporated by reference.

The transmitted signal is typically modulated in such a way that both an in-phase channel and a quadrature-phase channel are formed. Typically, the code sequences used on the in-phase and quadrature-phase channels are orthogonal or near orthogonal. In general, the data transmitted between nodes 102, 104 (pseudolite or user) can be modulated on one or the other or both of these channels. Further, the data modulated on the in-phase channel can be different from the data modulated on the quadrature-phase channel. To improve system performance by further increasing the system dynamic range, the transmitted signal can also be modulated by an additional code sequence. Such a code sequence may be applied to resolve bit synchronization and provide timing information on both or either of the in-phase and quadrature-phase channel(s).

The number of channels supported by the transmitters and receivers may or may not be the same as the number of pseudolite nodes 102. The only issue associated with the number of channels that are supported is that a sufficient number of channels should be available to avoid any near-far problem that exists in the deployment area. The architecture of each channel is similar to that of an ordinary Global Positioning System receiver, with the exception that every channel must optionally track a different carrier.

Although each pseudolite node 102 can operate on a single frequency (as is the case with the Global Positioning System), the system 100 also permits the use of multiple frequencies. Such multiple frequencies would typically be equally spaced by integer multiples of $\pi$ multiplied by the chipping rate. When multiple frequencies are used, a significant improvement in receiver dynamic range results, which eliminates the so-called "near-far" problem that reduces the effectiveness of single frequency systems.

In accordance with the embodiment of FIG. 1, the pseudolite nodes 102 are distributed in an ad-hoc manner, the only restriction being that each pseudolite node 102 must be able to make contact with one or more other pseudolite nodes 102 in the system 100. On initialization, the pseudolite nodes will exchange information to allow them to determine both the achievable connectivity of the network and the distance to each pseudolite node 102 having a direct communication path. As a result of this information, both the physical configuration and the network paths to each node in the system 100 can be determined. Using signals received from a known location, the specific geographic location of each pseudolite node 102 in the system 100 can be determined using, for example, the same kinds of algorithms which are commonly used in current GPS receivers. A similar process allows determining the location of user node 104 in the system 100.

In accordance with another embodiment, the pseudolite nodes 102 may be arranged in specific locations, eliminating the need to automatically determine the geographic locations and network paths in the system 100.

Figure 3:
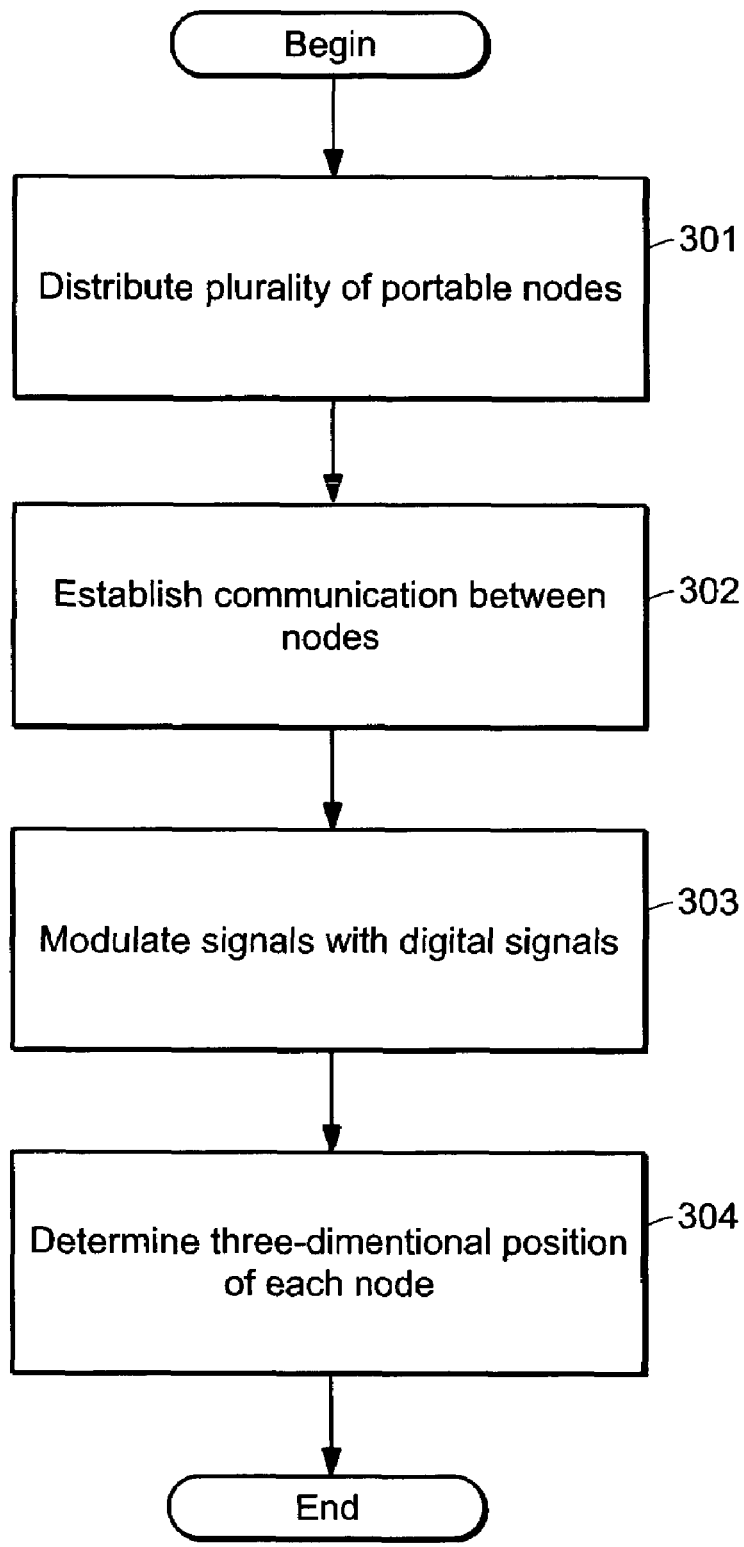
FIG. 3 is a flowchart illustration a method for locating the position of a communication node in an area in accordance with another embodiment of the invention.

FIG. 3 is a flowchart illustration a method for locating the position of a communication node in an area in accordance with another embodiment of the invention. A plurality of portable nodes are distributed 301 within the area. Each of the nodes includes a transmitter that generates a signal on one or more carrier frequencies, a receiver, and a processor. In process 302, communication between the nodes is established, and signals generated by nodes are modulated 303 with signals necessary to establish distances between the nodes and to convey data between the nodes. A three-dimensional position of each of the nodes is determined 304 using the modulated signals. Modulating signals generated by the nodes may include establishing at least two communication channels that are substantially orthogonal to one another.

Figure 4:
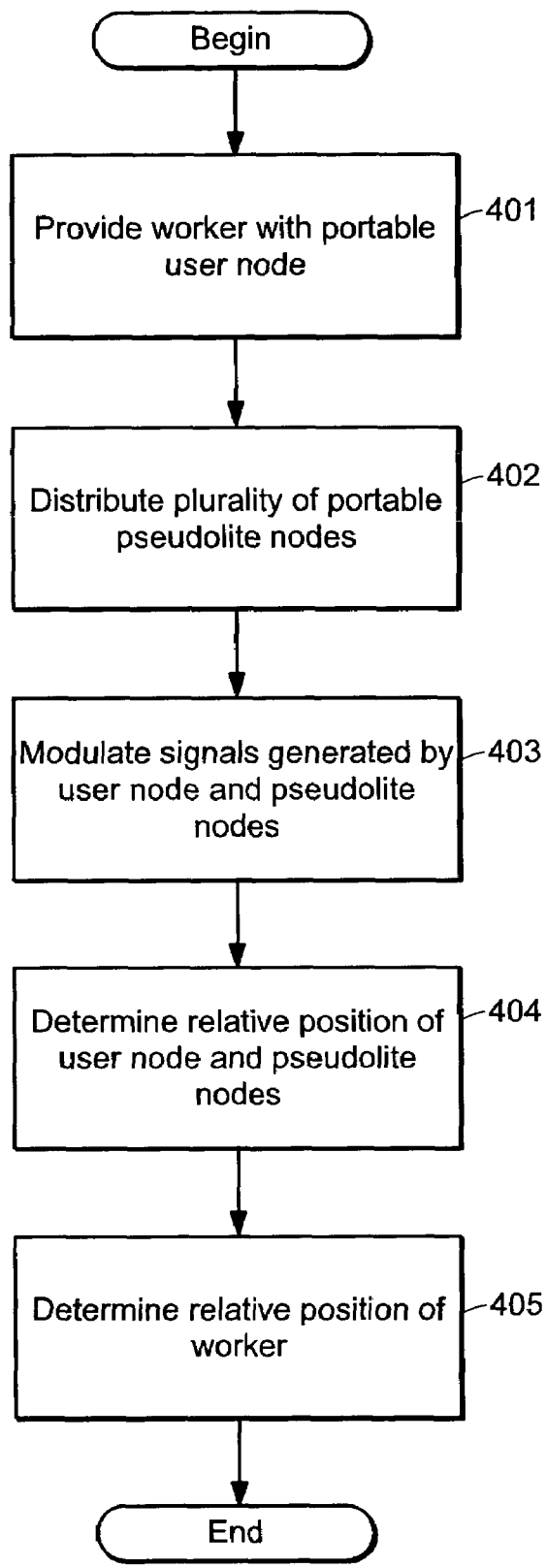
FIG. 4 is a flow chart illustrating a method for locating a human in an area in accordance with a further embodiment of the invention.

FIG. 4 is a flow chart illustrating a method for locating a human being such a firefighter or rescue worker, in an area in accordance with another embodiment of the invention. The person is provided with a portable user node in process 401. The user node includes a transmitter that generates a signal on one or more carrier frequencies, a receiver, and a processor. The user node may also include a user interface, as well as other input and output devices.

A plurality of portable pseudolite nodes are distributed 402 within the area. Each of the pseudolite nodes includes a transmitter that generates a signal on one or more carrier frequencies, a receiver, and a processor. Signals generated by the user node and the pseudolite nodes are modulated 403 with digital signals to establish communication among the user node and the pseudolite nodes and to convey data among the user node and pseudolite nodes. A relative position of the user node and the pseudolite nodes is determined 404 using the modulated signals, and a relative position of the firefighter or other person is determined 405 using the relative position of the user node and the pseudolite nodes.

In order to ensure that both positioning and communications among the user and pseudolite nodes are reliable, certain features may be included to ensure that the integrity of the system is preserved. In the case of communications information, integrity can be enhanced by encoding the signals in such a way that transmission errors may be detected and/or corrected. Commonly known methods of providing this form of integrity include techniques such as Viterbi coding or the inclusion of forward error correction ("FEC") codes. The reliability of position information may be enhanced using receiver autonomous integrity monitoring ("RAIM") techniques such as those commonly used in GPS receivers.

Further discussion related to indoor geolocation systems and integration systems related thereto may be found in "A DSSS/CDMA/FDMA Indoor Geolocation System" presented by Progri et al. at the Institute of Navigation (ION GPS 2002, Sep. 24–27, 2002, Portland, Oreg., pp. 155–164) and "GPS/Pseudolite/SDINS Integration Approach for Kinematic Applications" presented by Lee at the Institute of Navigation (ION GPS 2002, Sep. 24–27, 2002, Portland, Oreg., pp. 1464–1473) Further disclosure relating to pseudolite signal structure may be found in "The Impact of Proposed Pseudolite's Signal Structure on the Receiver's Phase Code Error" presented by Progri and Michalson at the Institute of Navigation (ION 57$^{th}$ Annual Meeting/CIGTF 20$^{th}$ Biennial Guidance Test Symposium, Jun. 11–13, 2001, Albuquerque, N. Mex., pp. 414–422) and "An Investigation of the Pseudolite's Signal Structure for Indoor Applications" presented by Progir et al. at the Institute of Navigation (ION 57$^{th}$ Annual Meeting/CIGTF 20$^{th}$ Biennial Guidance Test Symposium, Jun. 11–13, 2001, Albuquerque, N. Mex., pp. 453–462). Further disclosure relating to the "near-far" problem for indoor geolocation systems may be found "An Alternative Approach to Multipath and Near-Far Problem for Indoor Geolocation Systems" presented by Progri and Michalson at the Institute of Navigation (ION GPS, 2001, Sep. 11–14, 2001, Salt Lake City, Utah, pp. 1434–1443). All of these documents and presentations are hereby incorporated herein, in their entirety, by reference.

While the invention has been described in connection with specific embodiments thereof, it will be understood that it is capable of further modification. This application is intended to cover any variation, uses, or adaptations of the invention and including such departures from the present disclosure as come within known or customary practice in the art to which invention pertains.

What is claimed is:

1. A portable reconfigurable geolocation system comprising:
   a portable user node; and
   at least three portable pseudolite nodes in communication with one another and with the user node;
   the user node and pseudolite nodes each having:
   a transmitter that generates a signal on one or more carrier frequencies, each signal being modulated with digital signals necessary to establish distances between the nodes and to convey data between the nodes;
   a receiver for receiving and demodulating the signals transmitted between the nodes;
   a processor for receiving the demodulated signals, extracting data values and derived values from the demodulated signals and determining a three-dimensional position of each node in the system.

2. A system according to claim 1, wherein the user node further comprises a user interface.

3. A system according to claim 1, wherein communication between the nodes is wireless.

4. A system according to claim 1, wherein signals generated by the user node and the pseudolite nodes are modulated by at least two digital signals.

5. A system according to claim 4, wherein the at least two digital signals establish at least two communication channels that are substantially orthogonal to one another.

6. A system according to claim 4, wherein at least one digital signal provides signal selection for a particular signal frequency.

7. A system according to claim 4, wherein at least one digital signal provides interference resistance.

8. A system according to claim 4, wherein at least one digital signal provides bit synchronization resolution.

9. A system according to claim 1, wherein the processor optimizes ranging and communications topology of the system.

10. A system according to claim 1, wherein the processor verifies the integrity of information transmitted in the system.

11. A system according to claim 1, wherein the processor provides dynamic reconfiguration of the system in the event of node failure.

12. A method for locating a human in an area, the method comprising:
providing the human with a portable user node, the user node including a transmitter that generates a signal on one or more carrier frequencies, a receiver, and a processor;
distributing a plurality of portable pseudolite nodes within the area, each of the pseudolite nodes including a transmitter that generates a signal on one or more carrier frequencies, a receiver, and a processor;
modulating signals generated by user node and the pseudolite nodes with digital signals to establish communication among the user node and the pseudolite nodes and to convey data among the user node and pseudolite nodes;
determining a relative position of the user node and the pseudolite nodes using the modulated signals; and
determining a three-dimensional position of the human using the relative position of the user node and the pseudolite nodes.

13. A method according the claim 12, wherein providing the human with a portable user node includes providing the human with a portable user node that includes a user interface.

14. A method according to claim 12, where providing the human with a portable user node includes providing the human with a portable user node that includes an input/output device.

* * * * *